United States Patent [19]

Siebol

[11] 4,170,920

[45] Oct. 16, 1979

[54] BLIND SPACER FASTENER

[75] Inventor: George Siebol, Orange, Calif.

[73] Assignee: Olympic Fastening Systems, Inc., Downey, Calif.

[21] Appl. No.: 846,770

[22] Filed: Oct. 31, 1977

Related U.S. Application Data

[60] Division of Ser. No. 796,538, May 13, 1977, Pat. No. 4,074,608, which is a continuation of Ser. No. 632,498, Nov. 17, 1975, abandoned.

[51] Int. Cl.² ............................................. F16B 13/06
[52] U.S. Cl. .......................................... 85/72; 85/77
[58] Field of Search ................. 85/67, 69, 78, 77, 70, 85/71, 72, 73, 74–76; 151/41.72, 41.74; 52/787; 403/408

[56] References Cited

U.S. PATENT DOCUMENTS

| | | | |
|---|---|---|---|
| 2,248,755 | 7/1941 | Hathorn | 85/72 |
| 2,545,752 | 3/1951 | Singleton | 85/78 |
| 2,562,336 | 7/1951 | Selden | 85/70 |
| 2,767,877 | 10/1956 | Newsom | 85/78 X |
| 3,078,002 | 2/1963 | Rodgers | 85/72 |
| 3,232,162 | 2/1966 | Ketchum | 85/77 |
| 3,443,473 | 5/1969 | Tritt | 151/41.72 X |

FOREIGN PATENT DOCUMENTS

| | | | |
|---|---|---|---|
| 741502 | 8/1966 | Canada | 85/77 |
| 2304812 | 10/1976 | France | 85/67 |
| 711711 | 7/1966 | Italy | 85/67 |
| 613882 | 12/1948 | United Kingdom | 85/70 |

Primary Examiner—Rodney H. Bonck
Attorney, Agent, or Firm—Frost & Jacobs

[57] ABSTRACT

Blind fastening means for fastening thin materials together without crushing them. Such means comprises a blind rivet sleeve, a blind rivet pin provided with a head to engage the blind end of the sleeve, and spacing means provided intermediate the blind end of the sleeve and the head thereof. As the head of the pin is drawn against the blind end of the sleeve an enlarged blind head forms at the blind side of the materials being fastened while the spacer means engages the interior side of the uppermost of the materials being fastened whereby to prevent crushing of such materials. In one instance the spacer means comprises a spacer sleeve. In a modification the spacer means comprises a second enlarged blind head. The various enlarged blind heads may be achieved in several ways.

2 Claims, 23 Drawing Figures

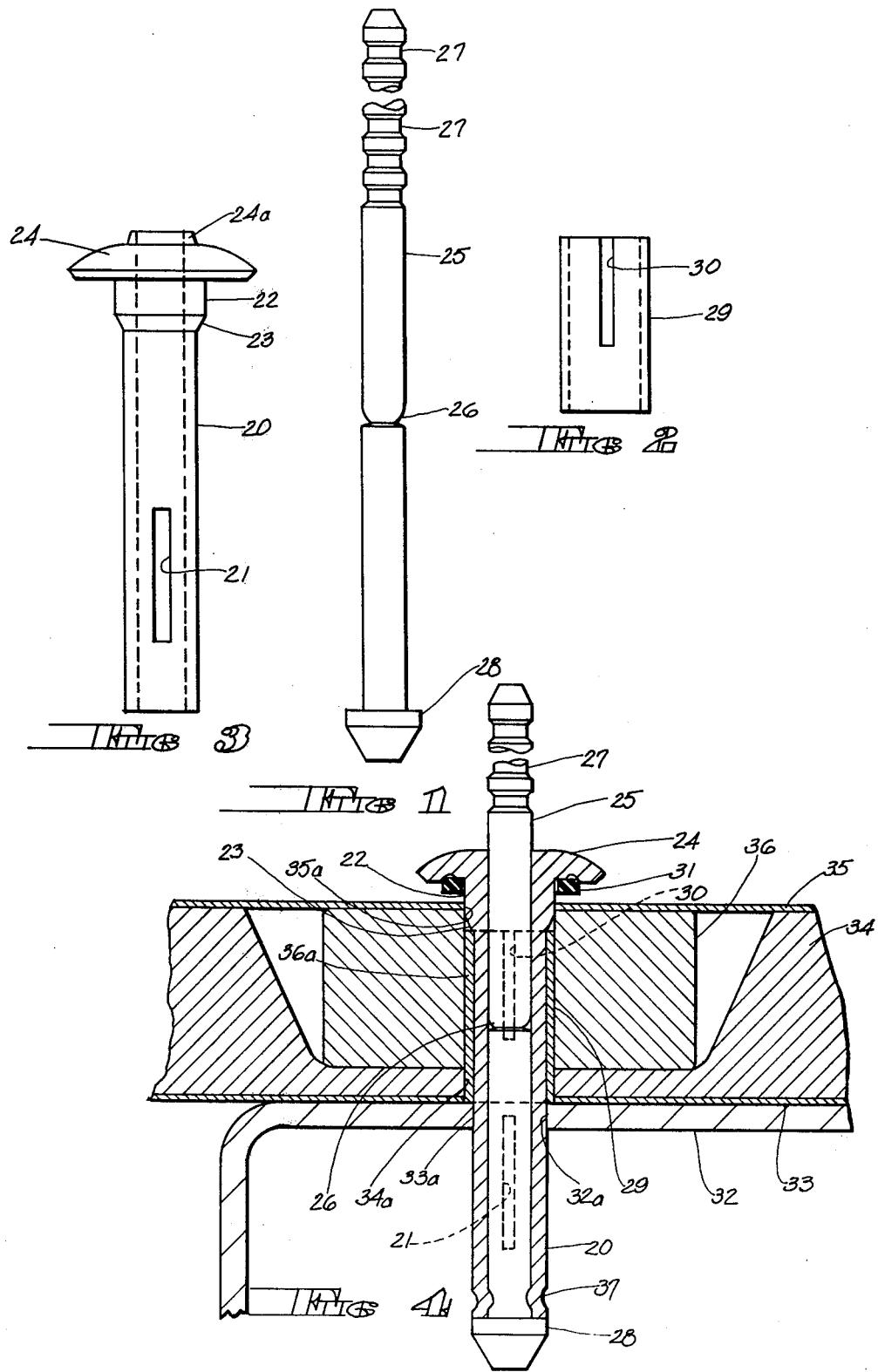

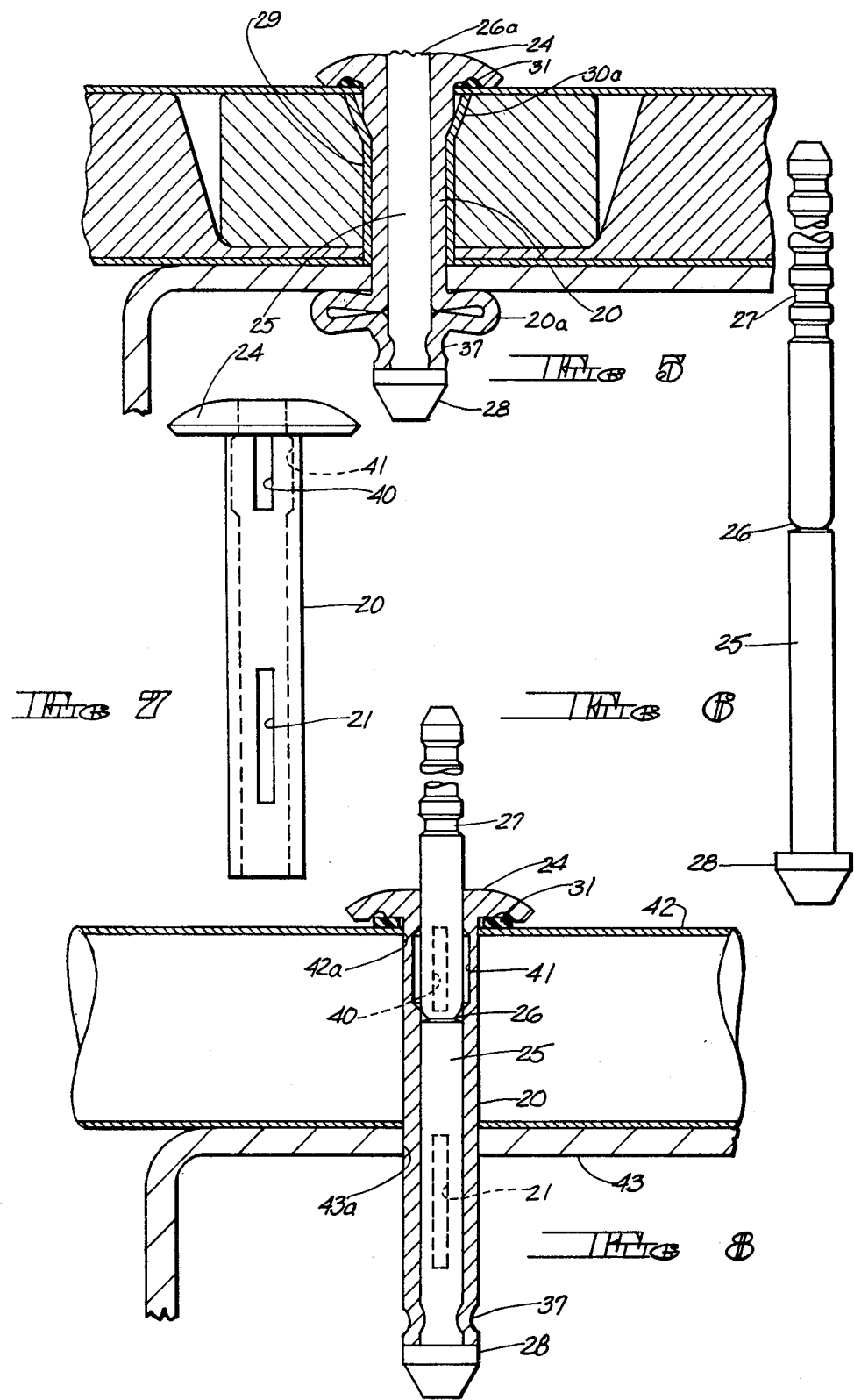

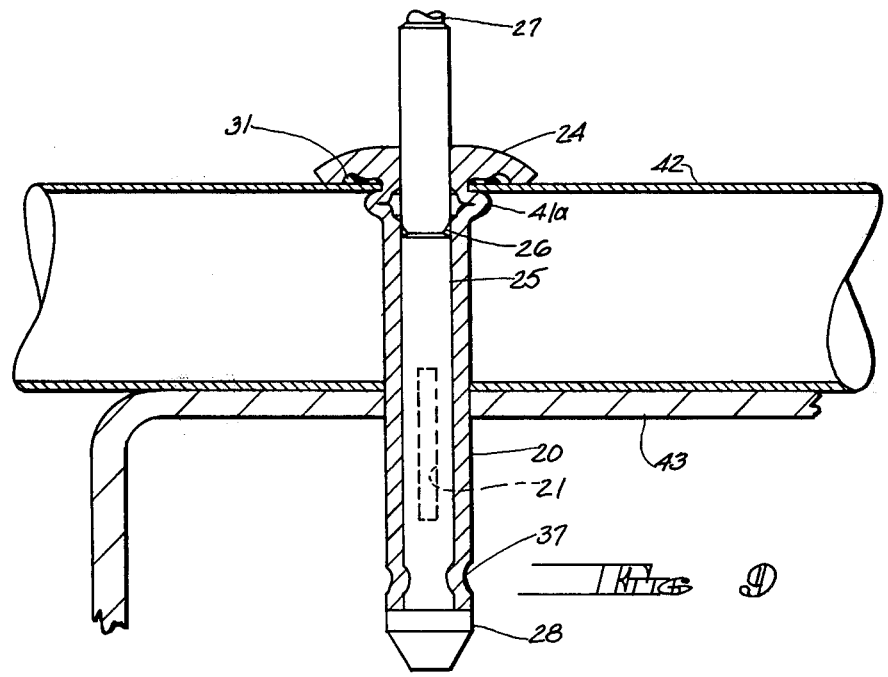
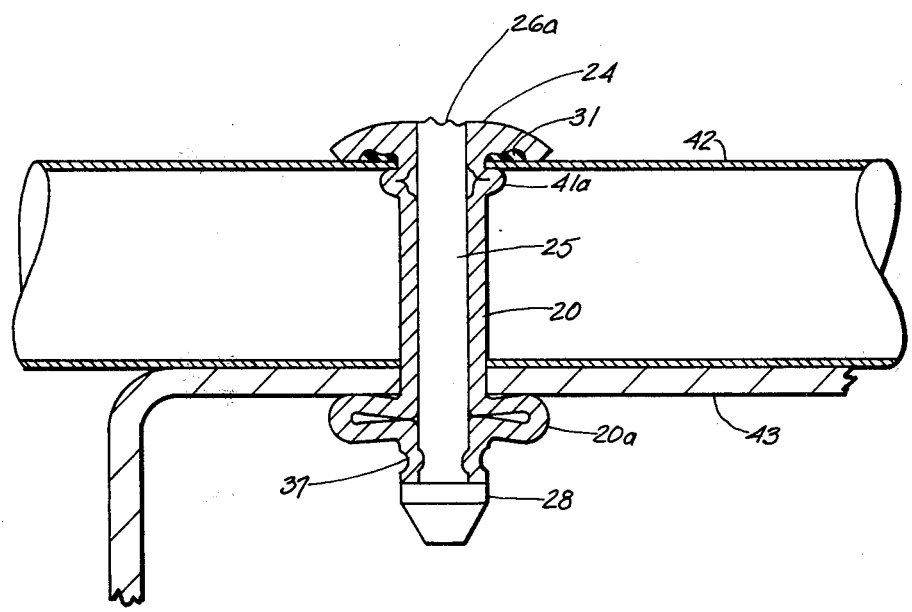

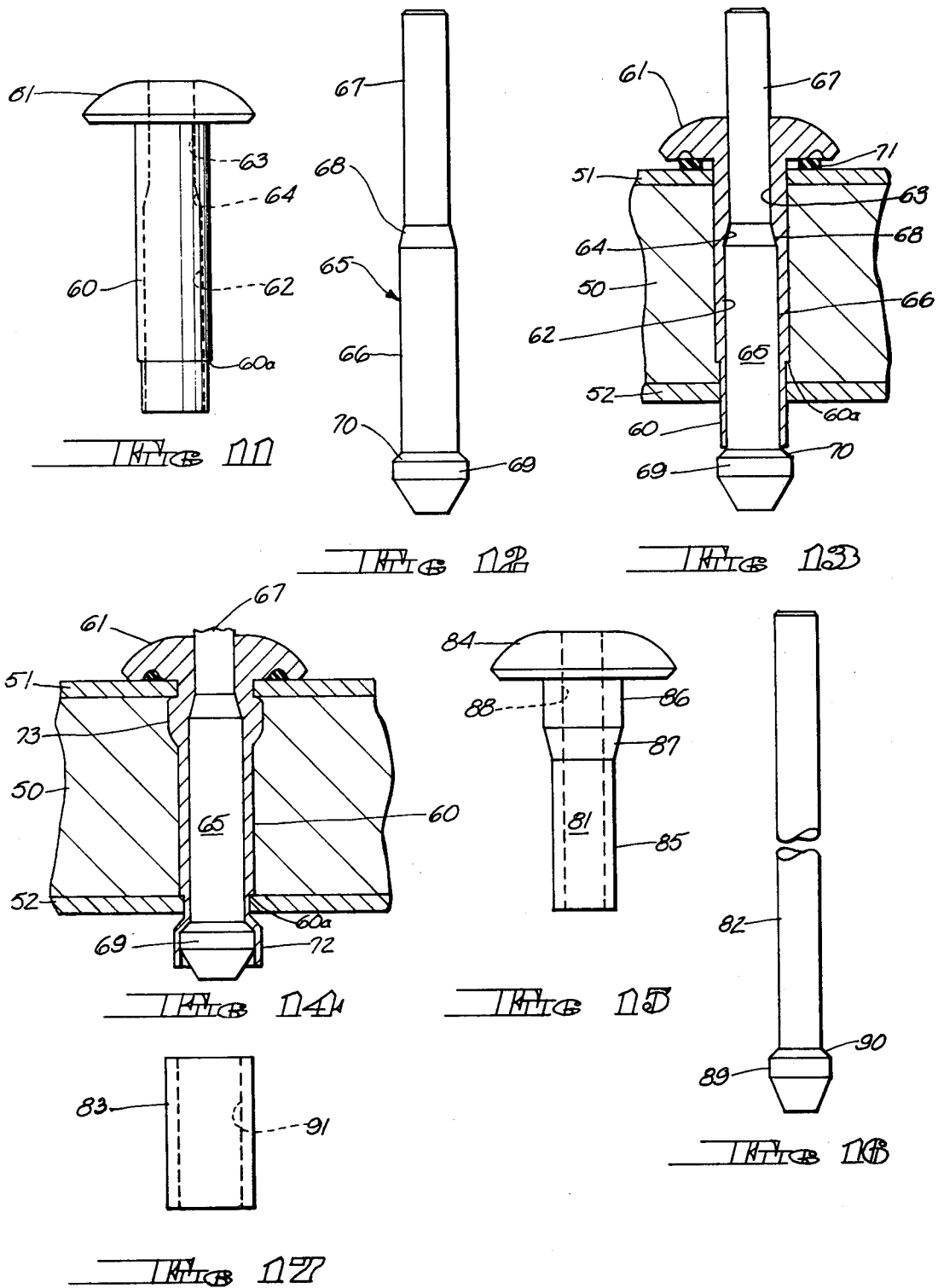

BLIND SPACER FASTENER

CROSS REFERENCE TO RELATED APPLICATION

This is a divisional application of prior continuation application Ser. No. 796,538 filed on May 13, 1977 in the name of the same inventor and entitled BLIND SPACER FASTENER; the prior continuation application Ser. No. 796,538, now U.S. Pat. No. 4,074,608, is a continuation of the then pending prior application Ser. No. 632,498 filed Nov. 17, 1975 in the name of the same inventor and entitled BLIND SPACER FASTENER, now abandoned.

BACKGROUND OF THE INVENTION

1. Field of the Invention

The blind spacer fastener of this invention offers a large potential in many areas wherein a given space is desired or required between structures being fastened. One such area is in sheet metal buildings where a foam spacer is used between the top sheet and the insulation blanket. Where the insulation blanket is resting on the roof support, often a purlin, the foam provides a spacer which is non-metallic between the top sheet and the support. Fasteners installed in this manner provide the possibility of attaching the top roof sheet without crushing the insulation blanket which would cause an insulation value loss of approximately 30%.

The fastener also has application when fastening honeycomb and the like to structural components so that the honeycomb structure will not collapse.

It is not necessary, however, that there be any material between the top and bottom sheets to which some other item is to be fastened; such fastener could, for example, be used to fasten something to a thin walled metal tubing.

In general the fastener concept of this invention may be utilized in those applications wherein it is important to keep the upper sheet(s) a desired or even a prescribed distance from the lower sheet(s). Other examples include foam filled panels, honeycomb panels, balsa wood panels with metal/plastic sheets, and stand-off where no material is between the upper and lower sheets. Other uses for this inventive concept will no doubt occur to those to whom the invention is made known.

2. Description of the Prior Art

A search of the prior art as represented by U.S. patents relating to this subject matter was conducted and the following U.S. Pat. Nos. were located:
3,078,002
3,512,328
3,055,255
3,230,818
3,667,340
3,789,728
3,797,358
3,640,361

Although it was the intent of the search to locate the art closest to that to which the invention is directed, no assertion is made that the patents listed are indeed representative of the best art.

U.S. Pat. No. 3,078,002 illustrates a blind fastener for honeycomb structure. While a number of embodiments are illustrated, in general they comprise a blind rivet pin or stem mounting a rivet head, a spacer sleeve and a lower cylindrical portion. Upon the pulling of the stem, the sleeve will cause the lower cylindrical member and the head to deform against the outer skins of the honeycomb, the sleeve serving as a spacer.

U.S. Pat. Nos. 3,512,328 illustrates a fastening device comprising a plastic screw 5, a blind rivet nut 4 and an additional screw 11. This reference illustrates the deformed portion 8 of blind rivet nut 4.

As indicated the search also turned up applicant's U.S. Pat. No. 3,230,818 which illustrates a blind rivet, the rivet sleeve of which is provided with longitudinal slots. U.S. Pat. No. 3,667,340 teaches a fastening device comprising a slotted sleeve 4 and a screw 27. The slotted sleeve permits lateral extension thereof.

Somewhat similar fastening means are set forth in the remaining patents but they do not appear to be closer than those discussed above.

SUMMARY OF THE INVENTION

In one of the applications illustrated, a roof support, by way of example a purlin, is shown surmounted by a plastic backing sheet, fiberglass insulation and a top sheet. Between the fiberglass insulation and the top sheet there is an additional foam spacer. The top sheet, foam spacer, fiberglass insulation and plastic backing sheet are provided with coaxial perforations having a diameter equivalent to the outside diameter of the spacer sleeve. The purlin, on the other hand, is provided with a coaxial perforation having a diameter equivalent to the outside diameter of that portion of the blind rivet sleeve having the longitudinal slots formed therein. The blind rivet pin is inserted in the blind rivet sleeve. A neoprene (or other suitable material) seal washer may be mounted on the blind rivet sleeve adjacent the head thereof in those applications, for example, where water tightness is required; such washer, however, may sometimes be omitted. The spacer sleeve is mounted on that portion of the blind rivet sleeve having the longitudinal slots therein. This entire assembly is placed through the above structure. A pulling force on the blind rivet pin causes that portion of the blind rivet sleeve containing the longitudinal slots to deform outwardly and engage the underside of the purlin. At the same time, the spacer sleeve is spread at its upper end by a shoulder on the blind rivet sleeve and engages the underside of the top sheet. By this arrangement the purlin and surmounting structure are joined together with the spacer sleeve serving to prevent crushing of the foam spacer. The blind rivet pin may then be broken off at a point of weakening to complete installation of the fastening device, the blind rivet sleeve and blind rivet pin also being staked together near the head end of the pin. The load limits provided in association with pin break-off, coupled with the spacer arrangement, insures that the desired spacing to prevent crushing is in fact realized.

The second embodiment of the blind fastener of this invention is similar to the first embodiment with the exception that the spacer sleeve has been eliminated together with the shoulder on the blind rivet sleeve. In place of the spacer sleeve, the blind rivet sleeve is provided with a region of weakness, as by a second set of longitudinal slots near its headed end. The material of the blind rivet sleeve between these slots is thinner than the material between the slots first described. In the use of this embodiment, the hole or perforations through the top sheet, foam spacer, fiberglass insulation, plastic backing sheet and purlin can all be of the same diameter, that is, the diameter of the blind rivet sleeve. During the fastening operation, the second set of longitudinal slots in the blind rivet sleeve enables outward deformation thereof, as by the folding over of sleeve material between the upper slots, which engages the underside of the top sheet, prior to the formation of the lowermost bulb, serving the same purpose as the spacer sleeve of the first embodiment. Pin break-off loads and the stronger region at the lower, exterior end of the sleeve helps to insure this desired spacing.

The blind fastener of this invention may also be utilized wherein there are no materials provided between upper and lower sheets, such as would be the case, for example, when thin metal tubing is fastened to some other object. Either of the arrangements just reviewed may accomplish this desired spacing depending on the slot locations, areas of weakness and strength or other spacing means, and pin break-off.

Other possibilities have also been shown, by way of further example as to how the inventive concept may be used, as will be described in greater detail shortly. One such possibility is to provide the interior of an unslotted ungrooved main rivet sleeve with a portion which may be wiredrawn to form a bulb to pick up the underside of the top sheet, and wire drawing the free end of such sleeve to pick up the bottom side (exterior) of the bottom sheet. Desired spacing is achieved by providing the exterior of the sleeve with a step or shoulder to engage the upper side of the lower member. A further possibility is to provide the exterior side of an unslotted, ungrooved main rivet sleeve with a ramp means to wiredraw an unslotted, ungrooved spacer sleeve to form an expanded portion to pick up the underside of the top sheet, again wire drawing the free end of the main sleeve to pick up the bottom sheet. In a variation of this last mentioned possibility the free end of the main sleeve is slit, slotted or grooved to aid in the formation of locking members to pick up the bottom sheet.

By way of further summary, the blind spacer fastener of this invention prevents crusing of soft materials between sheets, i.e., honeycomb, insulation, balsa wood and the like, it provides a structural load path for shear and tension from the upper sheet to the support structure, it allows "stand-off" or controlled spacing of one sheet from another, and it allows a tight seal between the fastener head and the upper or outer sheet without having to bear the load in the soft materials between the sheets.

BRIEF DESCRIPTION OF THE DRAWINGS

FIG. 1 is a side elevation, partly broken away, of one form of a blind rivet pin that may be utilized in this invention.

FIG. 2 is a side elevation of a spacer sleeve which may be used in this invention.

FIG. 3 is a side elevation of one form of a finished blind rivet sleeve which may be used in the invention.

FIG. 4 is a sectional view, partly broken away, of the blind spacer fastener elements of FIGS. 1 through 3, partly installed in a typical roof construction.

FIG. 5 is a view similar to FIG. 4 but showing the fastener as completely installed.

FIG. 6 is a view similar to FIG. 1 and disclosing a headed stem for use in connection with a modification of the invention.

FIG. 7 is a side elevation of a modified fastener sleeve.

FIG. 8 shows the elements of FIGS. 6 and 7 partly installed in an arrangement wherein a thin walled tube is to be fastened to another element.

FIG. 9 is a view similar to FIG. 8 but showing an intermediate condition of the parts as installation proceeds.

FIG. 10 is a view similar to FIGS. 8 and 9 but showing the modified blind spacer fastener completely installed.

FIG. 11 is a side elevation of one form of a finished blind rivet sleeve which may be used in a modification of the invention.

FIG. 12 is a side elevation of a modified blind rivet pin which may be used with the sleeve of FIG. 11.

FIG. 13 is a sectional view, partly broken away, of the blind spacer fastener elements of FIGS. 11 and 12, partly installed in a generalized application whrein it is desired to keep the upper sheet a prescribed distance from the lower sheet.

FIG. 14 is a view similar to FIG. 13 but showing the blind spacer elements of FIGS. 11 and 12 as completely installed.

FIG. 15 is a side elevation of a further finished blind rivet sleeve which may be used in a modification of the invention.

FIG. 16 is a side elevation, partly broken away, of a blind rivet pin which may be utilized with the modified sleeve of FIG. 15.

FIG. 17 is a side elevation of a modified spacer sleeve which may be used with the rivet sleeve and rivet pin of FIGS. 15 and 16 respectively.

DESCRIPTION OF THE PREFERRED EMBODIMENTS

Figure 14A:
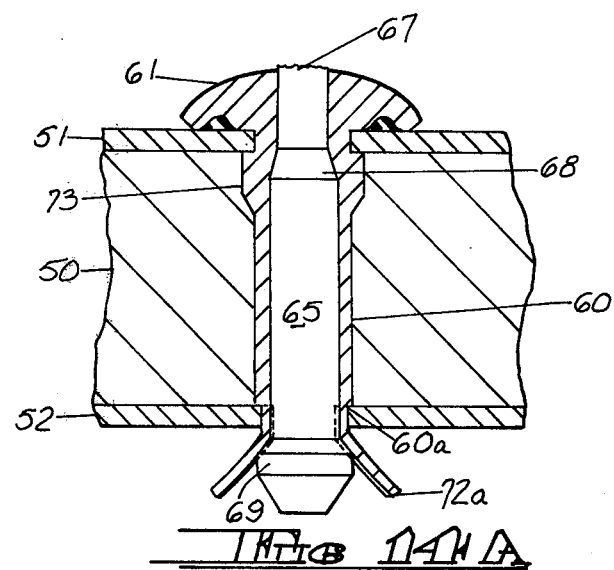
FIG. 14A is a view similar to FIG. 14 but showing the spacer sleeve as slotted.

FIGS. 4 and 5 illustrate the blind spacer fastener as utilized in connection with a typical roof construction. It is to be understood, however, as has been earlier mentioned and as will be further explained, that the inventive fastener concept of this invention has use in other applications wherein it is important to keep one sheet a desired distance from another sheet. As also illustrated in FIGS. 1 through 3 the fastener is comprised of a blind rivet sleeve 20 slotted as indicated at 21 and provided with an enlarged upper end 22, there being a flare or ramp 23 between the portions 20 and 22. The sleeve 20 is also provided with a head 24 which may have a crown 24a; this is optional and is usually omitted in the preferred embodiments. The fastener also includes a blind rivet pin 25 shown as having a single break groove 26 (in some instances more may be employed) and other indentations 27 therein, and a head 28. In the embodiment of FIGS. 1 through 5 a spacer sleeve 29 is utilized and this sleeve is provided with a series of slots 30. A seal washer may also be utilized. (Only one break neck is usually needed because the fastener controls the desired spacing and this is known for the particular job to which it is applied.)

In the application of that modification of the invention illustrated in FIGS. 1 through 5, which Figures also disclose a representative use of the invention, a purlin 32 is shown surmounted by a plastic backing sheet 33, fiberglass insulation or the like generally indicated at 34, and a top sheet of roofing material 35. Between the compressible fiberglass insulation 34 and the roofing 35 there is an additional foam spacer 36. The top sheet of roofing material 35, foam spacer 36, fiberglass insulation 34 and plastic backing sheet 33 are provided with coaxial perforations having a diameter equivalent to the outside diameter of the spacer sleeve 20 as measured at 22. The purlin 32, on the other hand, is provided with a coaxial perforation having a diameter equivalent to the outside diameter of that portion of the blind rivet sleeve having the longitudinal slots 21 formed therein. These perforations are designated by the reference numerals 35a, 36a, 34a, 33a and 32a. The outside diameter of the spacer sleeve 29 is equivalent to the diameters 33a through 36a.

To practice the invention, the blind rivet pin 25 is inserted in the blind rivet sleeve 20. The optional seal washer 31 is mounted on the blind rivet sleeve adjacent the head 24 thereof and the spacer sleeve 29 is mounted on that portion of the blind rivet sleeve having the longitudinal slots 21 therein. This entire assembly is placed through the above described coaxial perforations in the purlin and the surmounted structure. A pulling force is exerted on the blind rivet pin 25 as is known in the art and this causes that portion of the blind rivet sleeve 20 containing the longitudinal slots 21 to deform outwardly to form a bulb or the like 20a which engages the underside of the purlin 32. As this occurs, the spacer sleeve 29 is spread at its upper end by the ramp or shoulder 23 on the blind rivet sleeve 20 and it then engages the underside of the top sheet 35, tightly pressing the sheet 35 against the underside of the fastener head 24.

In this manner, the purlin 32 and surmounting structure 33 through 36 can be joined together with the spacer sleeve 29 serving to prevent crushing of the compressible insulation material 34 and foam spacer 36. The blind rivet pin 25 may then be broken off at the point of weakening 26 as indicated at 26a. It will be understood that the lower end of the sleeve 20 may be staked to the pin 25 as indicated at 37.

A second embodiment of the blind spacer fastener is illustrated in FIGS. 6 and 7. This embodiment is similar to the first embodiment and like reference numerals will be utilized to disclose like parts. The chief difference is that the spacer sleeve 29 has been eliminated together with the shoulder or ramp 23 on the blind rivet sleeve 20. In place of the spacer sleeve 29, the blind rivet sleeve 20 is provided with a second set of longitudinal slots 40 near its headed end. Between these slots 41 the sleeve 20 is provided with thinner walls or weakened areas 41. In the use of this embodiment the perforations through the top sheet, foam spacer, fiberglass insulation, plastic backing sheet and purlin, when such embodiment is applied as was the first embodiment in connection with the arrangement of FIGS. 4 and 5, can all be of the same diameter, that is, the diameter of the blind rivet sleeve 20.

During the fastening operation, the second set of longitudinal slots 40, together with the weakened areas 41, all in the blind rivet sleeve 20 enables outward deformation which produces a bulb or the like 41a (see FIG. 9) which engages the underside of the top member, serving the same purpose as the spacer sleeve 29 of the first embodiment shown in FIGS. 1 through 5.

As indicated, although not shown, the arrangement of FIGS. 6 and 7 could be used in place of the arrangement of FIGS. 1 through 3 and utilized in the construction illustrated in FIGS. 4 and 5. In such arrangement, the bulb 41a would engage the underside of the roofing material 35 first and then the bulb 20a would form against the purlin 32.

The blind spacer fastener modification depicted in FIGS. 6 and 7 is illustrated as applied to a construction wherein thin walled tubing 42 is clamped to an element 43 and this is illustrated in FIGS. 8 through 10. The fastener sleeve 20, stem 25 and washer 31 are assembled as before and inserted through axial perforations 42a and 43a which are of the same diameter as the sleeve 20. When the stem 25 is pulled in the usual manner, the slots 40 and weakened areas 41 will result first in deformation of the sleeve 20 to produce the bulb-like configuration 41a which will engage the tubing 42 and prevent collapse thereof; continued pulling of the stem 25 will thereafter cause formation of the bulb-like configuration 20a against the underside of the element 43. In this connection it will be observed that FIG. 8 shows the combined sleeve and stem as initially placed through the tube 42 and element 43. FIG. 9 illustrates the fact that the configuration 41a will form first, this being an intermediate stage in the assembly operation. FIG. 10, of course, illustrates the final assembly.

As earlier indicated it will be understood that when the modification of FIGS. 6 and 7 is employed in a construction as illustrated in FIGS. 4 and 5 the bulb 41a will first form against the underside of the roofing 35 and the bulb 20a will then form against the purlin 32. In such arrangement the open slots 40 and 21 in their respective locations provide blind side upset against the top sheet and blind side upset against the purlin, thus providing a seal against the underside of the head 24; this seal may be insured watertight by the use of the washer 31.

From the foregoing description it will be further apparent that during installation the upsetting pressure, in one instance, forces the sleeve 29 up the ramp 23 so as to expand the sleeve 29 in such manner that it would make contact with the top sheet as indicated at 30a (FIG. 5) forcing the top sheet 35 against the bottom side of the head 24 of the fastener thereby securing such top sheet tightly and allowing it to be waterproof; in the other instance, the bulb-like configuration 41a would first engage the interior wall of the tubing 42 so as to force such tube into tight engagement with the underside of the head 24 to allow a watertight joint. In both arrangements such constructions prevent deformations which would otherwise occur, the first providing a space where the low density foam material would not be overly crushed, and the second preventing collapse of the tube.

FIG. 3 illustrates a crown 24a on the head 24. The fastener may be manufactured with or without this crown and examples of a crownless head are depicted in various of the FIGS. 4 through 22. In some instances the crown on the head is used with multiple breakneck grooves to break the pin flush with respect to the top of the head of the fastener over a larger grip range. This, however, is not always necessary, particularly wherein other means are employed to break off the pin flush with the top of the head. In the arrangement of FIGS. 8 through 10, for example, wherein only a single break notch 26 is employed, and wherein the sleeve bulbs at 41a to pick up the underside of the top member 42, no ramp or spacer sleeve being employed, the crown could be eliminated.

Similarly the arrangement of FIGS. 1 through 5 could be modified to provide multiple break notches 26, noting again that a crown 24a could also be utilized if desired.

The crown 24a, although not preferred, does serve, when used, as a means to initiate pin breakage at the proper notch 26 when multiple notches are utilized.

The inventive fastener concept of this invention contemplates creation of a controlled space in that normally it is used wherein it is desired to keep one sheet a prescribed distance from another sheet. In addition a water tight seal may be obtained exteriorly of the sheets by the use of the washer 31 which is engaged between the outer side of the top sheet and the lower side of the sleeve head. In some instances, however, the use of the washer 31 may be considered optional, particularly in those instances wherein a watertight joint between the head and outer sheet is either not desired or not needed.

The arrangements of FIGS. 4 and 5 show a modification of the invention as applied to what has been termed a typical roof construction. As has been mentioned herein, however, many other applications lend themselves to the use of the spacer fastener concept of this invention. FIGS. 13, 14, 18, 19, 21 and 22, therefore, are intended by the reference numeral 50 to indicate generally the use of collapsable matter inserted between a pair of sheets 51 and 52 which are to be maintained at a prescribed distance from one another after the fastener has been completely installed and so that the material 50 is not squashed beyond a predetermined amount.

The general arrangement, therefore, represented by the structures depicted at 50 through 52, is meant to illustrate the invention as applied, by way of examples, to foam filled panels, honeycomb panels, and balsa wood panels with metal/plastic sheets; it will also be apparent to those skilled in the art that the spacer fastener concept could be used wherein there is no material 50 between the sheets 51 and 52.

Referring now to FIGS. 11 through 14 a modification involving the basic spacer fastener concept of this invention will be described. The fastener is comprised of a main rivet sleeve 60 having a crownless head 61, the sleeve having a pair of coaxial bores 62 and 63 joined by a ramp or beveled shoulder 64, and an exterior step or shoulder 60a; and a rivet pin generally indicated at 65 and having a first diameter 66 and a second diameter 67 joined by a ramp or beveled shoulder 68, the pin having a head 69 and a ramp 70. When the pin 65 is placed within the sleeve 60 as shown in FIG. 13 the pin portion 66 will be just nicely received within the bore 62, the pin portion 67 will be just nicely received within the sleeve bore 63, and the ramps 68 and 64 will be in engagement, the ramp 70 being at the end of the sleeve 60 removed from the head 61. The thus assembled sleeve and pin may then be placed through the members 50 through 52 and a washer 71 placed beneath the head 61 if desired. Initially the step 60a will be spaced from the upper side of the lower sheet 52 as illustrated in FIG. 13. That portion 67 of the pin which extends beyond the head 61 outwardly thereof is then engaged by a suitable tool as is well known in the art and the pin 65 is pulled so that the pin head 69 is moved towards the sleeve head 61. This pulling action causes the step 60a to engage the upper side of sheet 52 (FIG. 14) and such action also causes the ramps 70 and 68 to wire-draw the sleeve 60 so as to form the bulb-like formations 72 and 73 whereby to join the members 51 and 52 so as to effect a controlled space therebetween as determined by the location of the ramps 68 and 70 and by the location of the step 60a. The pin is broken off adjacent the top of the head 61 and the finished condition will be as illustrated in FIG. 14.

A further modification of the invention, also involving the same basic spacer fastener concept, is illustrated in FIGS. 15 through 19. The fastener is comprised of three principal components, namely, the main rivet sleeve 81, the rivet pin 82, and the spacer sleeve 83. The sleeve 81 has a head 84 which may be crownless if desired, a first outside diameter 85 and a second outside diameter 86 joined by a shoulder or ramp 87. The sleeve 81 has a bore 88 of constant diameter. The rivet pin 82 is of a constant diameter such as to just nicely be received within the bore 88 of the rivet sleeve 81 and the pin is provided with a head 89 and a ramp 90. The spacer sleeve 83 is preferably unslotted and ungrooved and is provided with a bore 91 to just nicely receive the portion 85 of the main rivet sleeve 81.

Figure 18:
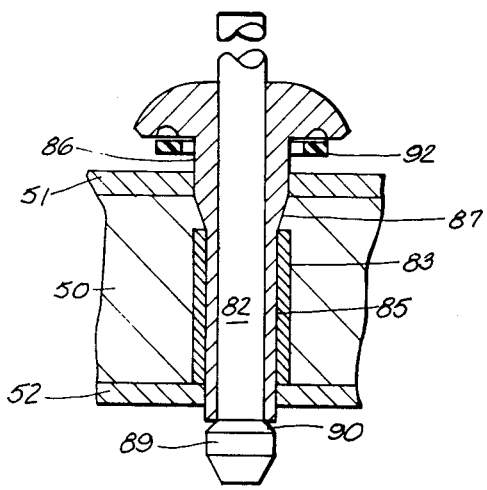
FIG. 18 is a sectional view, partly broken away, of the blind spacer fastener elements of FIGS. 15 through 17 partly installed in a generalized application wherein it is desired to keep an upper sheet a prescribed distance from a lower sheet.

The members 81, 82 and 83 are initially assembled within the members 50, 51 and 52 in the manner generally illustrated in FIG. 18; the washer 92 is optional. The pin head 89 is then pulled towards the sleeve head 84 in the usual manner. As this occurs the ramp 90 will wire draw the lower end of the sleeve portion 85 with the result that the spacer sleeve 85 will be moved up the sleeve ramp 87 thereby also to be wire drawn. This action results in the protrubances 93 on the sleeve 83 and 94 on the main rivet sleeve 81 being formed whereby again to effect joining of the members 51 and 52 with a controlled space therebetween which is filled by the substance 50.

Figure 19:
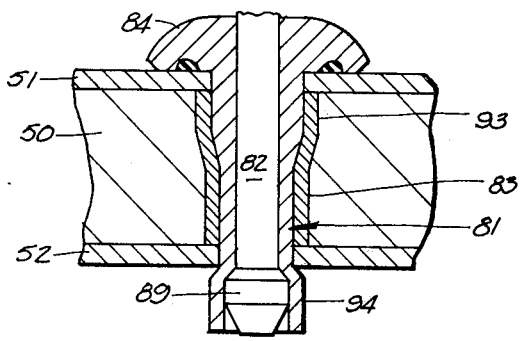
FIG. 19 is a view similar to FIG. 18 but showing the modified spacer fastener elements of FIGS. 15 through 17 as completely installed.
Figure 20:
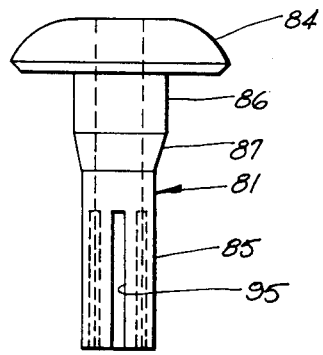
FIG. 20 is a side elevation of another form of a finished blind rivet sleeve which may be used in another modification of the invention.
Figure 21:
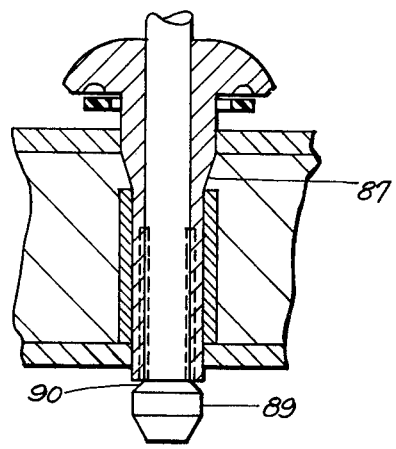
FIG. 21 is a sectional view, partly broken away, showing how the modified sleeve of FIG. 20 may be used in a generalized application depicting how an upper sheet may be kept a prescribed distance from a lower sheet.
Figure 22:
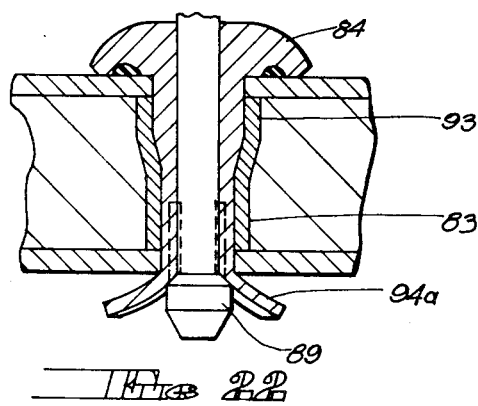
FIG. 22 is a view similar to FIG. 21 but showing the spacer fastener elements as completely installed.

A further modification of the invention is illustrated in FIGS. 20 through 22; this modification is generally like that of FIGS. 15 through 19 and, therefore, like numerals will be employed to designate like parts. The only difference in the arrangement of FIGS. 20 through 22 is that the lower end of the main rivet sleeve portion 85 may be provided with a plurality of slots 95; it is possible for the areas 95 simply to be grooves or lines of weakness rather than actual slots cut clear through the rivet sleeve. The number of slots or grooves 95 is cut critical; three or four slots will normally suffice although as few as two might be employed. When the members are assembled as indicated in FIG. 21 and then forced to the finished condition illustrated in FIG. 22, the spacer sleeve 83 will be forced over the ramp 87 so as to form the wire drawn protuberance 93; in this instance, however, the lower end of the main rivet sleeve, rather than being wire drawn as indicated at 94 in FIG. 19, is engaged by the ramp 90 on the rivet pin so as to form the petal-like projections 94a defined by the slots 95 or grooves or lines of weakness as the case may be.

Although the spacer sleeve 83 of FIGS. 17 through 19 and 21 and 22 is preferably unslotted and ungrooved, it is possible to provide it with slots, grooves or lines of weakness such as indicated at 30 in connection with the sleeve 29 illustrated in FIG. 2. This would result in petal-like projections similar to those just described in connection with the main rivet sleeve 81 of FIGS. 20 through 22 (94a) rather than the simple wire drawn protuberance 93 shown in FIG. 22.

It is believed that the foregoing constitutes a full and complete description of the blind spacer fastener concept of this invention and various modifications thereof. It is to be understood, however, that while several basic modifications have been illustrated, others may occur to those skilled in the art, all within the framework of the instant invention. It is to be further understood that although the invention has been described in connection with particular elements and arrangements, such elements and arrangements are not to constitute a limitation on the invention except insofar as they are specifically set forth in the subjoined claims.

Having thus described the invention, what is claimed as new and what is desired to be protected by Letters Patents is:

1. A spacer fastener for effectively joining a first member to a second member with a controlled space therebetween which comprises: a main rivet sleeve having an enlarged sleeve head thereon to engage the outside of said first member and a free end removed from said sleeve head; a rivet pin having a shank received within said main rivet sleeve and having a pin head thereon engaging said sleeve free end, said rivet pin shank including a pull portion with gripping means thereon extending beyond said sleeve head, said main rivet sleeve having a bore throughout its length which is configured so as to initially just nicely receive a major portion of the said shank; a portion of said main rivet sleeve towards said enlarged sleeve head being deformable to pick up the underside of said first member, said sleeve free end being deformable to pick up the outside of said second member, both deformations to take place as said pin head is drawn against said sleeve free end towards said sleeve head; an exterior step on said main rivet sleeve spaced from said sleeve free end and adapted to engage the upper side of said second member; and spaced means to effect said deformations, said spaced means comprising an interior ramp in said main rivet sleeve towards said enlarged sleeve head, a first pin ramp on said rivet pin in engagement with said sleeve interior ramp, and a second pin ramp on said pin head in engagement with said sleeve free end; whereby when said pin head is drawn toward said sleeve head said step engages the upper side of said second member and said first pin ramp forces said sleeve outwardly in the region of said sleeve interior ramp to form a first deformation protuberance on said main rivet sleeve to engage the underside of said first member, and said second pin ramp forces said sleeve free end outwardly to form a second deformation protuberance on said main rivet sleeve to engage the outside of said second member.

2. The fastener of claim 1 in which axial slots are provided in the said sleeve free end.

* * * * *

UNITED STATES PATENT AND TRADEMARK OFFICE
CERTIFICATE OF CORRECTION

PATENT NO. : 4,170,920
DATED : October 16, 1979
INVENTOR(S) : GEORGE SIEBOL

It is certified that error appears in the above-identified patent and that said Letters Patent are hereby corrected as shown below:

Column 2, line 3, "Nos" should be --No.--.
Column 8, line 53, "cut" should be --not--.

Signed and Sealed this

Seventeenth Day of June 1980

[SEAL]

Attest:

SIDNEY A. DIAMOND

*Attesting Officer*  *Commissioner of Patents and Trademarks*